UNITED STATES PATENT OFFICE.

JEAN MARIE RAYMOND, OF PARIS, FRANCE.

DISINFECTANT.

SPECIFICATION forming part of Letters Patent No. 423,530, dated March 18, 1890.

Application filed January 28, 1890. Serial No. 338,393. (No specimens.) Patented in France March 9, 1889, No. 196,589.

*To all whom it may concern:*

Be it known that I, JEAN MARIE (or JOHN MARY) RAYMOND, a citizen of the Republic of France, residing at Paris, in said Republic, have invented a new and useful Antiseptic, Disinfecting, and Deodorizing Compound, (for which I have obtained a patent in France, No. 196,589, dated March 9, 1889,) of which the following is a specification.

The object of this invention is to provide a new disinfectant capable of use for disinfection in general of all places infected by animal and vegetable matter in a state of decomposition, and also for the preservation of blood in an inodorous state and of its disinfection when it has begun to putrefy.

My new composition not only constitutes a compound disinfecting product, but also a deodorizing product.

The comparative study of the different ingredients employed up to this time in disinfection has shown me that those disinfectants—such as the chlorides of zinc or of lime, the sulphates of iron, of zinc, or of copper, phenol, thymol, cresyl, &c.—effected only a partial and consequently insufficient disinfection.

The idea occurred to me to make an analysis of the different kinds of gases that escape from decomposed matter, and which constitute with the bacteria they carry with them in their escape the elements of insalubrity to which is to be attributed, according to the hygienists, the greater part of the contagious diseases that decimate the populations of cities and those murderous epidemics which attack beasts. Having done that I sought to discover what were the antiseptic products offering guarantees of real efficiency in the fixation of those mephitic gases and the suppression of their injurious action. I had at the same time to make sure that in the grouping of these different products the isolated action of each one of them should not oppose or annihilate that of the other products mixed with them.

In principle my invention rests upon the association with a solution of sulphates of zinc of various antiseptic products producing the effect mentioned above. These products are the acetate of zinc, boric acid, the sulphate and the acetate of aluminum, the hyposulphite of soda, the biniodide of mercury, and acetic acid.

It is to be understood that according to the different applications to be made of my disinfectant I can group a variable number of the bodies mentioned above and vary the quantities of each one of them in the mixture.

To give an idea, I am going to mention farther on, but only as examples, two formulas which I have found preferable for each of two large classes of applications which have been mentioned in the beginning of the present memorial.

I. *Disinfectant for general disinfection.*—Water, one thousand grams; sulphate of zinc, three hundred to five hundred grams; hyposulphite of soda, thirty to fifty grams; sulphate of aluminum, thirty to thirty-five grams; boric acid, four to seven grams; acetate of zinc, ten to thirty grams; biniodide of mercury, (this last product is added only when an infection of great intensity is to be overcome,) from 0.10 to 0.25 centigram. This composition gives a complete product, the action of which is extremely efficacious for the disinfection of water-closets, urinals, gutters, water-spouts and wash-basins, stables, dog-kennels, walls, courts, floors, sick-chambers, soiled clothes, &c.

II. *Disinfectant of blood.*—Water, one thousand grams; acetic acid, fifteen to thirty grams; acetate of aluminum, fifty to one hundred grams; acetate of zinc, twenty to thirty-five grams; boric acid, four to seven grams; sulphate of zinc, one hundred and fifty to two hundred and fifty grams; sulphate of aluminum, two to five grams. This composition is more especially designed for slaughter-houses where the blood shed can in decomposing create centers of infection. In certain cases this composition can be simplified by the suppression of the sulphates of zinc and aluminum.

The experiments I have made with these two compositions have given me full satisfaction in enabling me to obtain a complete deodorization and disinfection, no ferment existing after the use of my products.

Having thus fully described my said invention, I claim—

A new disinfecting compound or composition of matter, consisting of acetate of zinc, boric acid, sulphate and acetate of aluminum, hyposulphite of soda, biniodide of mercury, and acetic acid, the whole combined in the proportions substantially as and for the purposes set forth.

In witness whereof I have hereunto signed my name in the presence of two subscribing witnesses.

JEAN MARIE RAYMOND.

Witnesses:
 A. MARO,
 D. H. BRANDON, Jr.